US012774993B2

(12) United States Patent
McCauley et al.

(10) Patent No.: US 12,774,993 B2
(45) Date of Patent: Oct. 27, 2026

(54) METHOD OF UTILIZING DEUTERIUM GAS FOR CHROMATOGRAPHY APPLICATIONS, DEUTERIUM GAS GENERATOR AND DEVICES FOR CONSERVATION THEREOF

(71) Applicant: Thermo Finnigan LLC, San Jose, CA (US)

(72) Inventors: Edward McCauley, Cedar Park, TX (US); Brody Guckenberger, Austin, TX (US); Scott Quarmby, Round Rock, TX (US)

(73) Assignee: THERMO FINNIGAN LLC, San Jose, CA (US)

( * ) Notice: Subject to any disclaimer, the term of this patent is extended or adjusted under 35 U.S.C. 154(b) by 290 days.

(21) Appl. No.: 18/473,054

(22) Filed: Sep. 22, 2023

(65) Prior Publication Data

US 2025/0102479 A1 Mar. 27, 2025

(51) Int. Cl.

| | |
|---|---|
| ***G01N 30/72*** | (2006.01) |
| ***B01D 15/16*** | (2006.01) |
| ***B01D 53/02*** | (2006.01) |
| ***G01N 30/16*** | (2006.01) |
| *G01N 30/02* | (2006.01) |

(52) U.S. Cl.

CPC ........... *G01N 30/722* (2013.01); *B01D 15/16* (2013.01); *B01D 53/025* (2013.01); *G01N 30/16* (2013.01); *G01N 30/7233* (2013.01); *G01N 2030/025* (2013.01); *G01N 2030/027* (2013.01)

(58) Field of Classification Search

CPC .. G01N 30/722; G01N 30/16; G01N 30/7233; G01N 2030/025; G01N 2030/027; G01N 30/20; G01N 2030/884; G01N 30/88; B01D 15/16; B01D 53/025

See application file for complete search history.

(56) References Cited

U.S. PATENT DOCUMENTS 3,208,826 A * 9/1965 Arnett .................... G01N 33/18 422/89
3,620,844 A * 11/1971 Ewald Wicke ......... C01B 3/503 429/513
4,464,925 A * 8/1984 Kolloff .................. G01N 27/18 73/23.4
6,557,412 B1 5/2003 Barbier et al.
(Continued)

FOREIGN PATENT DOCUMENTS

CN 111479377 A * 7/2020 ............. C23C 14/24
JP H07117411 B2 12/1995

OTHER PUBLICATIONS

V.G. Zaikin, A.I. Mikaya, Reaction gas chromatography and mass spectrometry: VI. Use of deuterium as the carrier and reagent gas in reaction gas chromatography-mass spectrometry, Journal of Chromatography A, vol. 301, 1984, pp. 77-91, ISSN 0021-9673 (Year: 1984).*
(Continued)

*Primary Examiner* — David J Bolduc
(74) *Attorney, Agent, or Firm* — Michael Best & Friedrich LLP

(57) ABSTRACT

A deuterium gas generator system. The deuterium gas generator system comprises an electrolysis cell and a palladium alloy purifier membrane having a surface area of not more than 10 square centimeters.

26 Claims, 8 Drawing Sheets

(56) References Cited

U.S. PATENT DOCUMENTS

| | | | | | |
|---|---|---|---|---|---|
| 6,649,129 | B1 * | 11/2003 | Neal | G01N 1/16 | 422/89 |
| 7,180,057 | B1 | 2/2007 | Senko | | |
| 8,371,152 | B2 | 2/2013 | McCauley et al. | | |
| 9,632,064 | B2 | 4/2017 | McCauley et al. | | |
| 9,874,546 | B2 * | 1/2018 | McCauley | G01N 30/18 | |
| 10,480,084 | B1 * | 11/2019 | Chawla | C25B 13/04 | |
| 11,255,828 | B2 | 2/2022 | McCauley | | |
| 11,574,801 | B1 * | 2/2023 | Campbell | H01J 49/0077 | |
| 2002/0042080 | A1 * | 4/2002 | Woods, Jr. | G01N 33/53 | 435/7.1 |
| 2002/0060288 | A1 * | 5/2002 | Hughey | H01J 49/0463 | 250/281 |
| 2007/0029476 | A1 * | 2/2007 | Senko | H01J 49/423 | 250/290 |
| 2007/0273381 | A1 * | 11/2007 | Kitagawa | G01N 24/087 | 324/318 |
| 2007/0286324 | A1 * | 12/2007 | Hagelstein | G21B 3/00 | 376/320 |
| 2009/0324816 | A1 * | 12/2009 | Chludzinski | C03B 37/01846 | 427/255.28 |
| 2012/0131987 | A1 * | 5/2012 | Gellert | G01N 30/462 | 73/23.42 |
| 2012/0187284 | A1 * | 7/2012 | Geyer | H01J 49/0009 | 250/252.1 |
| 2012/0231486 | A1 * | 9/2012 | Lavold | C07K 1/13 | 435/23 |
| 2012/0262178 | A1 * | 10/2012 | Dourdeville | G01R 33/307 | 324/321 |
| 2013/0118231 | A1 * | 5/2013 | McCauley | G01N 30/16 | 73/23.42 |
| 2015/0082864 | A1 * | 3/2015 | Chen | G01N 1/2202 | 73/19.12 |
| 2015/0330953 | A1 * | 11/2015 | McCauley | G01N 30/20 | 73/23.41 |
| 2016/0209377 | A1 * | 7/2016 | Goto | F16K 7/16 | |
| 2016/0310898 | A1 * | 10/2016 | Denton | C02F 1/4672 | |
| 2016/0368789 | A1 * | 12/2016 | Manabe | C01B 13/0207 | |
| 2021/0310998 | A1 * | 10/2021 | Mccauley | G01N 30/32 | |
| 2023/0183873 | A1 * | 6/2023 | Huang | B01D 53/229 | 423/584 |
| 2023/0349421 | A1 | 11/2023 | Jeung et al. | | |

OTHER PUBLICATIONS

Machine translation of CN111479377A (Year: 2020).*

* cited by examiner

METHOD OF UTILIZING DEUTERIUM GAS FOR CHROMATOGRAPHY APPLICATIONS, DEUTERIUM GAS GENERATOR AND DEVICES FOR CONSERVATION THEREOF

BACKGROUND

Ion traps and collision cells are often used in mass spectrometry, examples of which are well known in the art, see for example, U.S. Pat. No. 7,180,057 and U.S. Ser. No. 18/047,801. Typically, collision cells use nitrogen or argon because heavier gases are preferred for breaking apart ions. There are cases where hydrogen is used such as the reaction cell in an ICP-MS. Interestingly the collision cell can act as a collision or reaction cell depending on the gas which is introduced.

SUMMARY

Chromatography is a process for separating components of a mixture. By altering the mobile phase, the stationary phase, and/or the factor determining speed of travel, a wide variety of chromatographic methods have been created, each serving a different purpose and ideal for different mixtures.

Chromatography can be used as an analytical tool, feeding its output into a detector that reads the contents of the mixture. It can also be used as a purification tool, separating the components of a mixture for use in other experiments or procedures. Typically, analytical chromatography uses a much smaller quantity of material than chromatography meant to purify a mixture or extract specific components from it.

Gas chromatographs are well known devices used to separate chemical mixtures. Within a gas chromatograph is an analytical column which generally comprises an elongate fused silica capillary tube coated internally with a cross bonded stationary phase. The column may be from a few tens to a few hundreds of micrometres in diameter and vary in length from a few meters to as many as a hundred meters or so. It is known to use a carrier gas in these columns such as helium, nitrogen, argon, or hydrogen to allow transport of analytes through the column to a suitable detection system. The various gasses used as the carrier gas have differing viscosities, heat conductivities, diffusion rates and chemical activities amongst other properties.

Hydrogen is often used as a carrier gas for gas chromatography (GC) despite the flammable nature of hydrogen over a wide concentration range. Hydrogen can be delivered from a high pressure gas cylinder, or by using a hydrogen generator having an electrolysis cell such as a solid phase electrolyte PEM cell (Polymer Electrolyte Membrane) or from a liquid phase electrolysis cell utilizing an acidic or basic electrolyte solution.

However, while using hydrogen from a hydrogen generator is safer than using compressed cylinders due to the limited volume of hydrogen contained within the generator, the instantaneous volume of hydrogen is only one figure of merit regarding hydrogen safety. Another figure of merit concerning safety is the production rate capability of the device. For example, if there is a column break near the injection port of a gas chromatograph utilizing fore-pressure regulation, the flow of hydrogen into the oven can reach several hundred milliliters per minute. This presents a significant safety hazard unless the oven is equipped with a fast-acting hydrogen sensor which can both disable power to the heating element of the oven as well as shut down delivery of hydrogen from the gas generator. One example of this type of hydrogen sensor is the Series 9000 hydrogen sensor from Brechbuhler AG Switzerland. While capable of mitigating hydrogen risk, this type of sensor adds cost, size, complexity, and power consumption to the overall system. It is therefore desirable to either use alternative gases and/or to decrease the amount of gas required to enhance safety.

U.S. Pat. No. 9,632,064 describes an injection port for a gas chromatograph whereby hydrogen carrier gas is used for the separation process, while a non-hydrogen auxiliary pressurization gas is used to pressurize the inlet as well as act to provide septum purge and split flow gas. Such an implementation involving a first gas type used to act as carrier gas and a second gas type used to provide split and purge flows will be referred to herein as a carrier gas-decoupled injection port. Such injection ports allow safer operation with hydrogen, since the flow of hydrogen delivered to the injection port can be limited to a value in which the lower explosive limit (LEL) of hydrogen can never be achieved in the oven even in the event of a column break.

GC ovens are not hermetically sealed devices, and as such, low flows of hydrogen (such as 10 standard cubic centimeters per minute (sccm)) into the oven will diffuse out of the oven before LEL can be achieved. Additionally, the embodiments described in U.S. Pat. No. 9,632,064 will predominantly deliver inert pressurization gas in the event of a column break near the injection port. The inert pressurization gas will act to dilute the introduced hydrogen as well as act as a positive purge mechanism to displace hydrogen from the oven.

Conventional hydrogen generators for gas chromatography are designed to deliver upwards of one hundred milliliters per minute of hydrogen, with mid-sized units being capable of delivering 500 sccm. These higher flow rates are needed in order to support high split flows which are conventionally employed on GC systems having split-splitless injection ports (SSL), programmable temperature vaporization injection ports (PTV) or other types of inlets used for gas chromatography wherein a majority of carrier gas is split to atmosphere. As an example, a chromatograph method may operate in split injection mode whereby a column flow of 1 sccm is used in conjunction with a split flow of 300 sccm. This results in a split ratio of 300 to 1. Split mode injection is often used when sample concentration is high such as direct injection of a petroleum fraction. The terms "inlet" and "injection port" are used interchangeably herein.

While the practice of U.S. Pat. No. 9,632,064 can prevent the buildup of an unsafe level of hydrogen within the confines of a chromatograph oven, external leaks in the plumbing of a conventional generator can still present a flammability risk due to the high flow rate potential. In addition, the high flow capacity of these units often precludes the use of palladium membrane purification techniques due to the high cost of palladium. Conventional units are also heavy, occupy valuable bench space, are noisy due to needing large cooling fans for the power supplies and use large amounts of power.

The aforementioned shortcomings have been addressed in co-pending application U.S. 63/387,953. However, while the teachings of U.S. 63/387,953 enable the production of extremely high purity hydrogen and methods of safe operation along with small size, cost and power footprint, not all mass spectrometer detectors are compatible with the use of hydrogen as a carrier gas.

In particular, GC-Orbitrap instruments require ultra-high vacuum on the order of 4×10^10 Torr in the mass analyzer region in order to prevent rapid transient decay and subsequent loss of signal intensity. The poor performance with hydrogen in these instruments is related to the lower compressibility of hydrogen in turbomolecular pumps relative to other gasses as well as its ability to rapidly diffuse through ion-optical pathways between various vacuum regions of the instrument intended to operate at large pressure differentials. Although nitrogen or argon may be used without sacrifices in high vacuum integrity, these gasses result in low sensitivity for ion sources employing electron ionization (EI) or chemical ionization (CI) when used at typical flow rates of one to two milliliters per minute. As a consequence, helium is the only viable carrier gas for GC-Orbitrap instruments when such flows into the ion source are required. As is known, helium is a limited natural resource with increasing difficulties of procurement or no availability in some parts of the world.

Chromatography may also be used as an analytical tool by coupling the chromatograph to a detection system, such as a mass spectrometer. Mass spectrometry can be used to perform detailed analysis on samples. It can provide both qualitative (e.g., is X present) and quantitative (e.g., how much X is present) data for a large number of compounds in a sample. These capabilities have been used for a wide variety of analysis, such as to test for drug use, determine pesticide residues in food, monitor water quality, and the like.

A typical mass spectrometer utilized for GC-MS, LC-MS, IC-MS, or ICP-MS generally requires some means of high vacuum pumping. Such pumping helps remove permanent gases (e.g., nitrogen and oxygen) as well as carrier gases (e.g., helium, hydrogen, or nitrogen) in order to achieve appropriate mean free path lengths for the transmission of ion beams. Removal of such gases additionally prevents unwanted ion-molecule reactions, collisional scattering, oxidation of source components and high voltage breakdown. And such pumping helps maintain a high vacuum environment to remove introduced contaminants which would otherwise result in adverse analytical performance.

Different types of ion traps use different gases depending on the mission. Heavier gases are generally preferred because they collisionally damp ions and improve trapping efficiency and fragmentation efficiency. However, heavy gases cause issues when ions are ejected in the case of linear or 3D quadrupole ion traps. Therefore, helium is often used as a compromise in molecular weight.

Because of the availability of helium and the fact that it is non-renewable because it escapes to space, labs would like an alternative. Hydrogen is too light to collisionally damp in a reasonable amount of time, so it is often doped with a little nitrogen or argon to give an effective molecular weight near that of helium. Precise mixing gases is complicated and buying premixed gases is expensive since these particular mixtures are non-standard.

Accordingly, there is a need in the art for an alternate gas to helium that address at least some of the abovementioned issues.

The present disclosure relates to uses and methods employing deuterium gas as a carrier gas for Gas Chromatography-Mass Spectrometry (GCMS) applications and devices for generation and conservation of deuterium gas. In particular, the present disclosure relates to low-flow deuterium utilization whereby the total deuterium usage and/or generation is less than 10 standard cubic centimeters per minute (sccm) per system. The method of using deuterium gas in collision cells and ion-traps, which may be used with chromatography systems is also described.

In one aspect, the disclosure provides a deuterium gas generator system. The deuterium gas generator system comprises an electrolysis cell and a palladium alloy purifier membrane having a surface area of not more than 10 square centimeters.

In another aspect, the disclosure provides a method of gas chromatography. The method comprises using deuterium gas as a carrier gas in a gas chromatography system.

In another aspect, the disclosure provides a carrier gas-decoupled injection port. The carrier gas-decoupled injection port comprises a carrier gas-decoupled inlet and a compressed cylinder deuterium.

Other aspects of the disclosure will become apparent by consideration of the detailed description and accompanying drawings.

DETAILED DESCRIPTION

Figure 1:
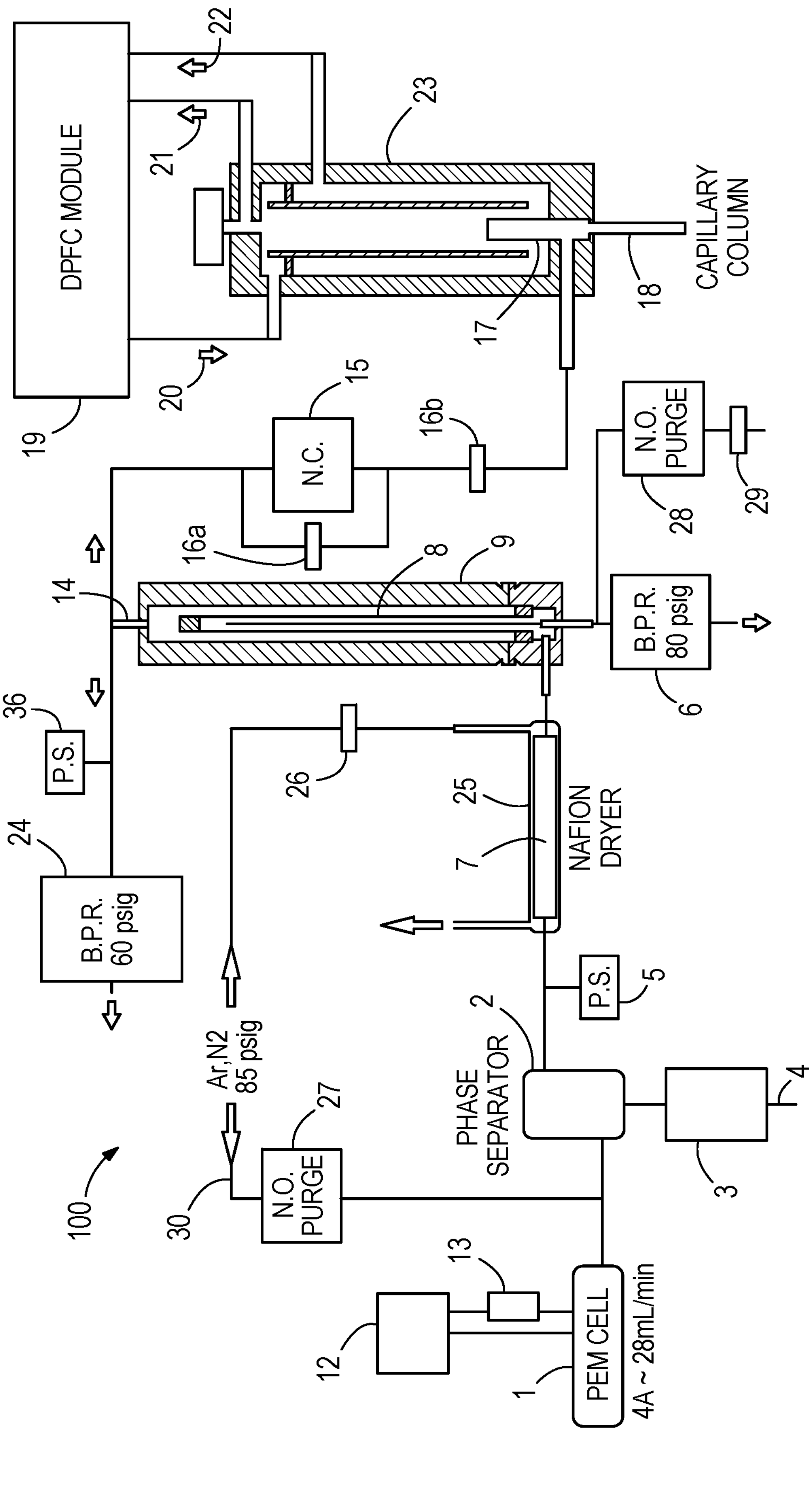
FIG. 1 is a schematic diagram of a gas generation system.

Before any implementations of the disclosure are explained in detail, it is to be understood that the disclosure is not limited in its application to the details of construction and the arrangement of components set forth in the following description or illustrated in the following drawings. The disclosure is capable of other implementations and of being practiced or of being carried out in various ways.

The present inventors have found that deuterium can surprisingly be used as an effective substitute for helium in GCMS applications involving high resolution mass analyzers and in particular, ion traps and collision cells, where deuterium has the advantage of being significantly dryer than helium which may reduce ion/molecule interactions and/or the formation of erroneous ions formation.

There are three forms of the element hydrogen consisting of protium which is the "normal" isotope of hydrogen which has been traditionally employed for carrier gas use, the other forms of hydrogen being the stable isotope deuterium and the radioactive isotope tritium. All of these have very similar chemistry but differ in mass due to the number of neutrons contained in the nucleus. All are also diatomic gas species, that is to say they exist under normal states of temperature and pressure as molecules comprising two atoms. Although these atoms may combine in various combinations such as protium-deuterium, deuterium-tritium and protium-tritium, unless otherwise noted herein, the term "deuterium" will refer to the isotopically pure diatomic deuterium-deuterium species while "hydrogen" will refer to the isotopically pure protium-protium species.

The inventors have also conceived of a carrier-gas-decoupled inlet system utilizing deuterium gas and an electrolyzer system for electrolysis of deuterium oxide (heavy water) with improvements directed toward reduction of evaporative losses as well as gas dryer losses of deuterium oxide not described in co-pending application U.S. 63/387,953. The electrolyzer may hereinafter be referred to as the system of the disclosure.

Thus, the present disclosure provides deuterium gas generator system comprising a carrier gas-decoupled injection port, wherein the deuterium generator system comprises an electrolysis cell and a palladium alloy purifier membrane having a surface area of not more than 10 square centimeters in order to conserve deuterium gas and/or prevent the loss of heavy water. As used herein, the term "gas-decoupled injection port" means an injection port as described in U.S. Pat. No. 9,632,064. This is an injection port which is configured to provide two key features differentiating itself from conventional injection ports. The first key feature is that the injection port allows for two different gas types to enter the injection port at the same time during analysis.

One gas type is used to provide gas flow to the analytical column (carrier gas) while the second gas type is used to pressurize the injection port and provide the requirements of split flow and septum purge flow (auxiliary gas). The second key feature is the provision of a back diffusion barrier which serves to decouple the two gas types. The back diffusion barrier allows for the auxiliary gas to pressurize the inlet and control the flow of carrier gas through the column without intermixing with the carrier gas entering the column during analysis. Since the column flow is typically much lower than the flows used to support the split flow and septum purge flow, gas-decoupled injection ports can be used in at least two significant ways. One way is to conserve carrier gas when an expensive or difficult to procure carrier gas is employed such as helium, and another way is to increase the margin of safety when a flammable carrier gas is used such as hydrogen. These key features are also described in U.S. Pat. Nos. 8,371,152 and 9,632,064 respectively. As may be appreciated, deuterium gas is both expensive as well as flammable, so the advantages of a gas-decoupled injection port are compounded.

An electrolysis cell uses electrical energy to split deuterium oxide (heavy water) into its basic elements deuterium and oxygen. Deuterium gas is formed on an active surface (cathode) within the electrolysis cell. Any electrolysis cell may be used in the system defined herein. However, it may be preferred that the electrolysis cell is a polymer electrolyte membrane (PEM). The core of the PEM electrolyzer technology is the proton (deuteron in the case of heavy water) conducting polymer membrane from which the name is derived. This membrane separates the reaction compartments for deuterium and oxygen, and also provides the ionic contact between the electrodes, which is essential for the electrochemical process. Production of the deuterium gas itself takes place on the surface of the respective precious metal electrode.

Where the system comprises a PEM, the PEM may comprise a sulfonated fluoropolymer (such as a sulfonated tetrafluoroethylene based fluoropolymer-copolymer, i.e. Nafion). The sulfonated fluoropolymer may be coated with a catalyst in order for provide anode and cathode surfaces. For example, the sulfonated fluoropolymer may be coated with iridium ruthenium oxide on the anode side and platinum black on the cathode side. The skilled person will appreciate that other coatings may be used to provide the desired effect.

The active deuterium surface of the electrolysis cell (such as the PEM) may be not more than 10 square centimeters, such as not more than 5 square centimeters, or not more than 3 square centimeters. For example, the active deuterium surface may be from about 1 square centimeter to about 5 square centimeters. The deuterium generation current applied to the electrolysis cell (such as the PEM) may be not more than 7 amperes, such as not more than 4 amperes.

For example, the deuterium generation current may be from about 1 ampere to about 7 amperes, such as about 4 amperes. The limitation of the active deuterium production surface and/or the deuterium generation current results in a decrease in the production rate of deuterium gas. Typically, the deuterium production rate of the electrolysis cell (such as the PEM) is limited by both physical and electrical means. That is the electrolysis cell may have an active deuterium production surface area of the cell membrane of 5 square centimeters or less (for example, from about 1 square centimeter to about 5 square centimeters, or from about 2 square centimeters to about 3 square centimeters) and a deuterium generation current of 7 amperes or less, such as from about 1 amperes to about 7 amperes, such as about 4 amperes applied to a single cell.

The system of the disclosure may provide deuterium gas production rates of not more than 100 standard cubic centimeters per minute (sccm), such as production rates of not more than 25 sccm. For example, the deuterium gas production rates may be from about 1 sccm to about 100 sccm, or from about 5 sccm to about 50 sccm or from about 10 sccm to about 25 sccm.

In the system of the disclosure, the palladium alloy purifier membrane may be a single linear tube of palladium alloy. For example, the palladium alloy may be palladium silver alloy. The palladium silver alloy may comprise palladium:silver in a ratio of from about 1:99 to about 99:1, such as from about 10:90 to about 90:10 or from about 30:70 to about 70:30. In a preferred aspect, the palladium:silver ratio may be from about 85:15 to about 70:30, such as 77:23, i.e. 77% palladium and 23% silver.

The palladium purifier membrane may be separate from the electrolysis cell or may be integrated within the electrolysis cell. That is the palladium purifier membrane may act as the cathode in the electrolysis cell. Where the palladium purifier membrane is integrated in the electrolysis cell, the operating temperature of the palladium purifier membrane may be from about 60 degrees to about 100 degrees Celsius.

Where the palladium purifier membrane is separate from the electrolysis cell the operating temperature of the palladium purifier membrane may be from about 310 degrees to about 400 degrees Celsius.

In the system of the disclosure, the palladium purifier membrane has a surface area no greater than 10 square centimeters, such as no greater than 5 square centimeters. For example, the palladium purifier membrane may be from about 1 square centimeter to about 10 square centimeters, such as from about 2 square centimeters to about 8 square centimeters or about 5 square centimeters.

The electrolysis cell in the system of the disclosure may comprise a piezoelectric pump. The piezoelectric pump may have a volumetric flow capacity of no more than 20 milliliters per minute, such as from about 1 milliliter per minute to about 20 milliliters per minute, or from about 5 milliliter per minute to about 15 milliliter per minute.

The system of the disclosure may comprise a forepressure means of pressure regulation such as a forepressure regulator. Typically, the forepressure may be set using a variable current to a PEM cell with closed loop feedback control from a pressure sensor in order to produce deuterium gas on a demand basis. Embodiments utilizing forepressure regulation can minimize consumption of expensive heavy water by producing deuterium on a demand basis.

The forepressure means of pressure regulation is set to provide a target pressure of the deuterium gas. For example, providing a pressure of from about 45 psig to about 100 psig, such as about 60 gauge pounds per square inch (psig). The forepressure regulator may provide an upstream pressure of from about 60 psig to about 150 psig, preferably about 80 psig.

The system of the disclosure may comprise a dry gas purged polymer ionomer for removing heavy water vapor from the deuterium gas. Alternatively, (or in addition to) a gas dryer such as an indicating silica gel sorbent trap may be used to prevent heavy water from being lost from the deuterium gas to the atmosphere. The polymer ionomer drier may be kept under vacuum. The polymer ionomer drier may be purged with dry gas.

The system of the disclosure may further comprise a chilled reflux tube on the oxygen waste vent in order to minimize loss of heavy water to the atmosphere. The system of the disclosure may further comprise an indicating silica gel sorbent trap to prevent heavy water from being lost from the oxygen waste vent to the atmosphere. Typically, the polymer ionomer for drying deuterium (if used) may be a sulfonated fluoropolymer, such as a sulfonated tetrafluoroethylene based fluoropolymer-copolymer, also known as Nafion™, although other polymers may be used.

The system of the disclosure may comprise a polymer electrolyte membrane and a palladium silver purifier membrane having a surface area of not more than 10 square centimeters. The system of the disclosure may comprise an electrolysis cell comprising a palladium alloy purifier membrane having a surface area of not more than 10 square centimeters. The electrolysis cell may comprise a heavy water circulation loop comprising a piezoelectric pump. The electrolysis cell may be a polymer electrolyte membrane.

The system as defined above may be integrated into a module within a chromatograph chassis assembly. As noted above, in general helium, and less so hydrogen, are typically used as carrier gases in gas chromatography. It has been surprisingly and unexpectedly discovered by the inventors that deuterium may be used as a GC carrier gas in such systems. Thus, the present disclosure further provides, a method of using deuterium gas as a carrier gas in a gas chromatography system.

In particular, a gas chromatography system using high (preferably ultra-high) vacuum. The deuterium gas may be provided by a deuterium gas generator system as defined above. Alternatively, the deuterium gas may be provided by a compressed cylinder of deuterium gas. The chromatography system may comprise a gas-decoupled injection port. The system may be used in combination with an ion trap or a collision cell.

The present disclosure also provides a method of gas chromatography wherein the carrier gas is deuterium, in particular for GCMS applications involving high resolution mass detection. The present disclosure also provides a gas chromatography system comprising a deuterium generator system, wherein the deuterium generator system comprises an electrolysis cell and a palladium alloy purifier membrane having a surface area of not more than 10 square centimeters.

The above noted and various other aspects of the present disclosure will become apparent from the following description which is given by way of example only and with reference to the accompanying drawings. The systems, uses and methods defined herein provide deuterium gas as a carrier gas for gas chromatography applications, for example GCMS applications, as well as safer and more cost-effective deuterium usage as well as generation in a gas generator. They also provide the use of deuterium in ion traps and collision cells, that may or may not be used in combination with the systems defined herein.

Prior art carrier gas types include nitrogen, hydrogen, helium, argon and argon-methane mixtures. Often, the carrier gas chosen depends on the type of detector used on the chromatograph. For example, a 5% argon-methane mixture may be utilized for electron capture detectors while pure helium may be used for a thermal conductivity detector.

In general, mass spectrometer detectors require helium or hydrogen for GCMS applications. Gasses including nitrogen and argon or argon-methane mixtures are unsuitable for GCMS at flow rates typically used e.g. 1-2 milliliters per minute due to rapid degradation of sensitivity for electron ionization.

However, although most mass spectrometers utilized for GCMS applications can use hydrogen as a carrier gas, some instrument types cannot. These include GC-Orbitrap platforms. In these instruments ultra-high vacuum is necessary in the mass analyzer section of the instrument in order to have long mean-free-paths between ions and neutral particles. As is known, different gasses have varying degrees of pumping speed as well as compression ratios for a selected pump design. In general, hydrogen has poor compression relative to higher molecular weight gasses. Poor compression results in back-migration of hydrogen from the foreline back into the lower pressure regions of the instrument. Lowering of the partial gas pressure of hydrogen in the foreline can be accomplished through the use of a larger displacement forepump. This has the disadvantage of higher pump cost, weight, operating expense, heat dissipation etc. Turbomolecular pumps are also available with special design considerations for hydrogen compression. These pumps can also reduce the analyzer pressure, particularly if they are arranged in a "true" differential pump arrangement wherein multiple turbo pumps are used along with independent backing pumps of high displacement. Again, this increases cost, complexity, size, and power requirements.

Even with the aforementioned improvements, hydrogen can also rapidly diffuse through the ion optical elements and pathways between chambers increasing analyzer pressure resulting in rapid transient decay. Helium has thus been the required carrier gas in such systems. It has been surprisingly and unexpectedly discovered by the inventors that deuterium may be used as a GC carrier gas in such systems without loss of ultra-high vacuum which otherwise results in rapid transient decay. Deuterium, being a diatomic gas with each atom having a mass of 2 Daltons is thus a molecular species having a mass nearly identical to that of helium having a mass of 4 Daltons. This results in superior compression efficiency, lower rates of diffusion through lens stacks and subsequent ultra-high vacuum integrity.

Reference will now be made in detail to various embodiments of the present disclosure(s), examples of which are illustrated in the accompanying drawings and described below. While the disclosure(s) will be described in conjunction with exemplary embodiments, it will be understood that present description is not intended to limit the disclosure(s) to those exemplary embodiments. On the contrary, the disclosure(s) is/are intended to cover not only the exemplary embodiments, but also various alternatives, modifications, equivalents and other embodiments, which may be included within the disclosure as defined by the appended claims.

FIG. 1 illustrates a deuterium generator system 100 in accordance with the present teachings comprising a polymer electrolyte membrane (PEM) cell 1 which may have an active deuterium production surface area of the cell membrane of 5 square centimeters or less. For example, from about 1 square centimeter to about 5 square centimeters, or from about 2 square centimeters to about 3 square centimeters. The membrane of PEM cell 1 comprises a sulfonated fluoropolymer such as Nafion 115. The membrane is in the form of a catalyst coated membrane (CCM) which may have a coating of iridium ruthenium oxide applied to an anode side of the membrane while platinum black may be applied to a cathode side of the membrane. The membrane of PEM cell 1 should not be confused with the tubular Nafion membrane of Nafion drier 7 or the palladium-silver membrane 8 of palladium purifier 9 described later.

Additionally, a secondary limitation may be applied to PEM cell 1 by limiting the deuterium generation current to 7 amperes or less, such as from about 1 amperes to about 7 amperes, or from about 2 amperes to about 4 amperes applied to a single cell.

These imposed limitations of membrane size and current increase the margin of safety of deuterium system 100 over conventional systems used for hydrogen production which are designed with higher flow capacity, and which also may incorporate multiple PEM cells in a so-called PEM "stack" arrangement. These limitations also allow the deuterium generator to have a smaller size and reduced power consumption.

Described herein is a method of gas chromatography, the method comprising using deuterium gas as a carrier gas in a gas chromatography system. The method may comprise using a high-vacuum in the gas chromatography system. The high-vacuum may be an ultra-high vacuum. The method may further comprise providing a compressed cylinder of deuterium gas. The method may further comprise using a deuterium gas generator system including an electrolysis cell and a palladium alloy purifier membrane having a surface area of not more than 10 square centimeters, and providing the deuterium using the deuterium gas generator system. The method may further comprise including a gas-decoupled injection port in the chromatography system. The method may further comprise including an ion trap or a collision cell. The method may further comprise using deuterium gas in a collision cell or an ion trap. The method may further comprise using the collision cell or ion trap in combination with a chromatography system. The chromatography system may be a gas chromatography system. The method may further comprise utilizing deuterium as a carrier gas. The chromatography system may be a liquid chromatography system. The method may further comprise providing the deuterium gas via a deuterium gas generator system or via a compressed cylinder of deuterium gas. The method may further comprise including a gas-decoupled injection port in the chromatography system.

Embodiments described herein can utilize non-demand-based back-pressure regulation in order to achieve the best steady state operation and lifetime, or demand-based fore-pressure regulation in order to reduce the cost of operation. Briefly, fore-pressure regulated systems measure a pressure decrease in a system and increase flow in order to restore a target pressure. An example of this is a common pressure regulator used on a high pressure gas cylinder. On the other hand, a backpressure regulated system typically has a constant rate of gas introduction and responds to a pressure increase in the system by opening a pressure relief valve downstream of the system in order to restore a target pressure. The advantages of fore-pressure regulation when using deuterium are explained as follows. Demand-based generators deliver a variable amount of gas flow based on demand. If demand increases, the current density of the PEM cell or electrolyzer automatically increases to offset the increase in demand. This prevents wastage of generated gas since it is the generation of gas which sets the target pressure rather than the venting of gas from a fixed gas introduction rate. For hydrogen, back-pressure regulation is desirable since hydrogen is inexpensive and this mode offers relatively static pressures and flows with less component stress. For deuterium, fore-pressure regulation is preferred in order to reduce purge waste since deuterium is expensive.

The embodiment of FIG. 1 uses a constant current power supply (not shown) to deliver a fixed current such as 4 amperes to PEM cell 1. A pump 13 recirculates heavy water from reservoir 12 through PEM cell 1 in closed loop fashion. A deuterium gas/heavy water mixture emanating from the cathode side of PEM cell 1 is introduced to a phase separator 2 which removes liquid heavy water from gaseous deuterium and returns the heavy water to reservoir 12 from an exit tube 4 of a pulsed solenoid valve 3. The phase separator 2 may use an optical float switch under microprocessor control in order to set the liquid level in phase separator 2. A Nafion dryer 7 of deuterium system 100 is configured to efficiently remove heavy water vapor from the gas stream by surrounding it with a purge tube 25 having a dry gas feed such as argon or nitrogen. The pressure of the dry gas along with a fixed restrictor 26, can be chosen to establish a purge flow sufficient to reduce the heavy water vapor pressure to a low "relative humidity" such as 5%. Advantageously, the dry argon or nitrogen flows in a direction opposite that of the deuterium flow in order to increase efficiency. When the deuterium reaching the palladium purifier 9 is less than 5% relative humidity, then only a low purge flow is required through back-pressure regulator 6 in order to prevent concentration polarization. Even so, the production rate of PEM cell 1 must be excessive in order to keep a positive flow through back pressure regulators 6 and 24 which establish an upstream and downstream pressure across palladium alloy membrane 8. Nafion dryer 7 can operate with high efficiency if the exterior of the membrane is purged with a dry inert gas such as nitrogen or argon. Alternatively, the exterior may be held under vacuum using a suitable vacuum pump.

Following generation in the PEM cell 1, the deuterium gas travels to a phase separator 2. The phase separator 2 may be of conventional design and may comprise a pressure vessel, a float and magnetic or optical switch.

When heavy water enters phase separator 2, the float may perturb or break a light beam between a light emitting diode and phototransistor. This information can trigger a current pulse to a solenoid valve in order to discharge the heavy water while retaining the gas phase deuterium at a pressure above atmospheric pressure.

The phase separator 2 may alternatively comprise a Hall effect sensor, a magnetic reed switch, a mechanically operated float switch or other means known in the art. The float incorporated into phase separator 2 may comprise a low-density water-resistant solid polymer such as polymethylpentene otherwise known as TPX. Float switches for liquid level sensing utilizing TPX are described for example in U.S. Pat. No. 6,557,412 using a Hall Effect sensor for liquid level sensing, or as in Japanese patent JP7117411 using and infrared light beam interrupter.

The phase separator 2 separates gaseous deuterium from liquid heavy water and can be configured to discharge heavy water through a solenoid valve 3 and discharge port 4. The discharged heavy water may return to a reservoir 12 serving to feed the PEM cell after first passing through a mixed bed ion exchange resin cartridge (not shown) in a closed-loop arrangement as is conventionally employed in hydrogen generators in order to remove positively charged trace metallic ions formed from corrosion of metallic components as well as non-metallic anions formed due to ingress of atmospheric carbon dioxide. The ion exchange resin may be charged with deuterium in place of hydrogen in both the cationic and anionic resin forms.

Due to the small production capacity of PEM cell 1, a non-conventionally employed water pump such as a piezoelectric micropump 13 may be used. These types of pumps have very limited flow capacity but have higher reliability than brushless water pumps and lower cost than micro gear pumps. They also can be made much smaller. An example of this type of pump is model SDMP320 from Takasago Electric Inc. Japan. This pump has a volumetric flow capacity of 20 milliliters per minute and incorporates a single active moving part. The active component comprises a piezoelectric bimorph which acts under the influence of a high voltage low current alternating power supply. The size of this pump is a mere 5.5 mm in thickness with a length and width of 33 mm. Another example of such a pump is the Bimor Series BPS-215i from Nitto Kohki Ltd. Japan. This pump has a volumetric flow of 30 milliliters per minute and is capable of operating directly on mains power yet demands less than 3 milliamps of current to operate. Piezoelectric pumps are not only reliable, cost effective, small, and self-priming, they also draw less power than pumps used in conventional hydrogen generators. The low flow features of piezoelectric micropumps as described are impractical for use on conventional hydrogen generators since they do not have adequate flow rates to clear stagnant oxygen from the PEM cell anode. Stagnant oxygen pockets can result in diminished PEM cell capacity as well as shortened PEM cell lifetime.

The piezoelectric micropump 13 may have a flowrate of 30 milliliters per minute or less of heavy water. A pressure sensor 5 providing feedback to an electronic drive circuit can be used to control a solenoid valve 6 to set a target pressure upstream of palladium alloy membrane 8 such as about 80 gauge pounds per square inch (psig). The electronic drive circuit may further comprise a microcontroller.

The flow rate of gas generated by PEM cell 1 is selected such that a positive purge flow remains through both back pressure regulators 6 and 24. Deuterium exiting the phase separator 2 though void of liquid heavy water is nonetheless saturated with heavy water vapor. In order to reduce the risk of downstream condensation, a moisture removal device such as a sulfonated tetrafluoroethylene based fluoropolymer-copolymer, also known as a Nafion™ drier 7 can be in the deuterium flow path upstream of a gas purifier 9.

Figure 2:
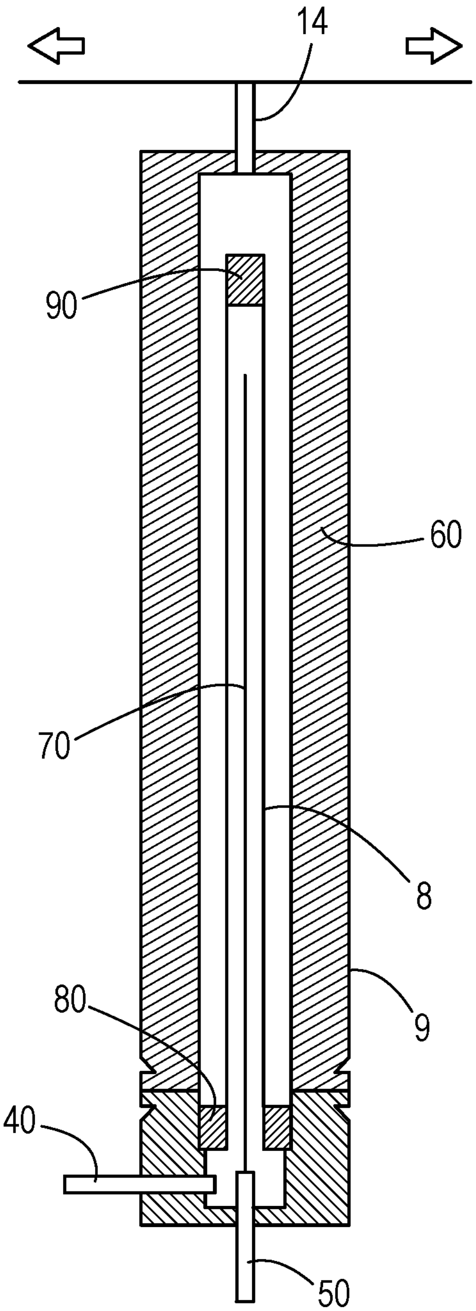
FIG. 2 is a schematic diagram of a palladium purifier of the gas generation system of FIG. 1.

Reference is now given to FIG. 2 which provides a more detailed description of a gas purifier, in the form of a palladium purifier 9 that may be utilized in a system as described in FIG. 1. For simplicity, the remaining description may exemplify the purifier as the palladium purifier 9. However, as will be understood by the skilled person other purifiers may be used. The purifier 9 preferably comprises a single linear tube of palladium-silver alloy. Prior art palladium purification devices employ a multiplicity of palladium alloy tubes, or a single long tube formed in a coiled configuration. Coiled tubes are compact but have the disadvantage of pressure induced deformation. Multiple linear tubes have the disadvantage of increased complexity as well as an increased chance of flammable deuterium leakage due to the leak probability of any given tube being multiplied by the number of tubes. Both of these prior art implementations also suffer from high palladium cost, so modern systems used for hydrogen generation typically use purification techniques involving pressure swing adsorption, temperature swing adsorption or silica gel drying despite the lower level of hydrogen purity that is produced. Embodiments of the present disclosure can utilize amounts of palladium unsuitable for prior art hydrogen generators. Typically using palladium in amounts much less than in prior art hydrogen generators.

Impure deuterium enters conduit 40 and is confined to entering the interior of palladium purifier 9. Palladium purifier 9 may house a palladium alloy membrane 8 comprising an alloy of palladium and silver such as 77% Pd and 23% Ag. This ratio of palladium-to-silver content is preferred and is known to minimize the internal membrane stress when the membrane is exposed to hydrogen or deuterium when less than about 310 degrees Celsius. Other alloy compositions known in the art may be utilized. As a non-limiting example, the palladium alloy membrane 8 may comprise a 2-millimeter outer diameter tube having a wall thickness of 0.06 mm and a length of 60 millimeters. The preferred length of membrane 8 is from about 20 mm to about 100 mm. The preferred diameter of membrane 8 is from about 1 mm to about 3 mm and the preferred wall thickness of membrane 8 is from about 0.03 mm to about 0.1 mm. The composition of the alloy may be 75% palladium and 25% silver. Preferred ranges of the palladium-silver membrane are from about 15% to about 30% silver.

Figure 3A:
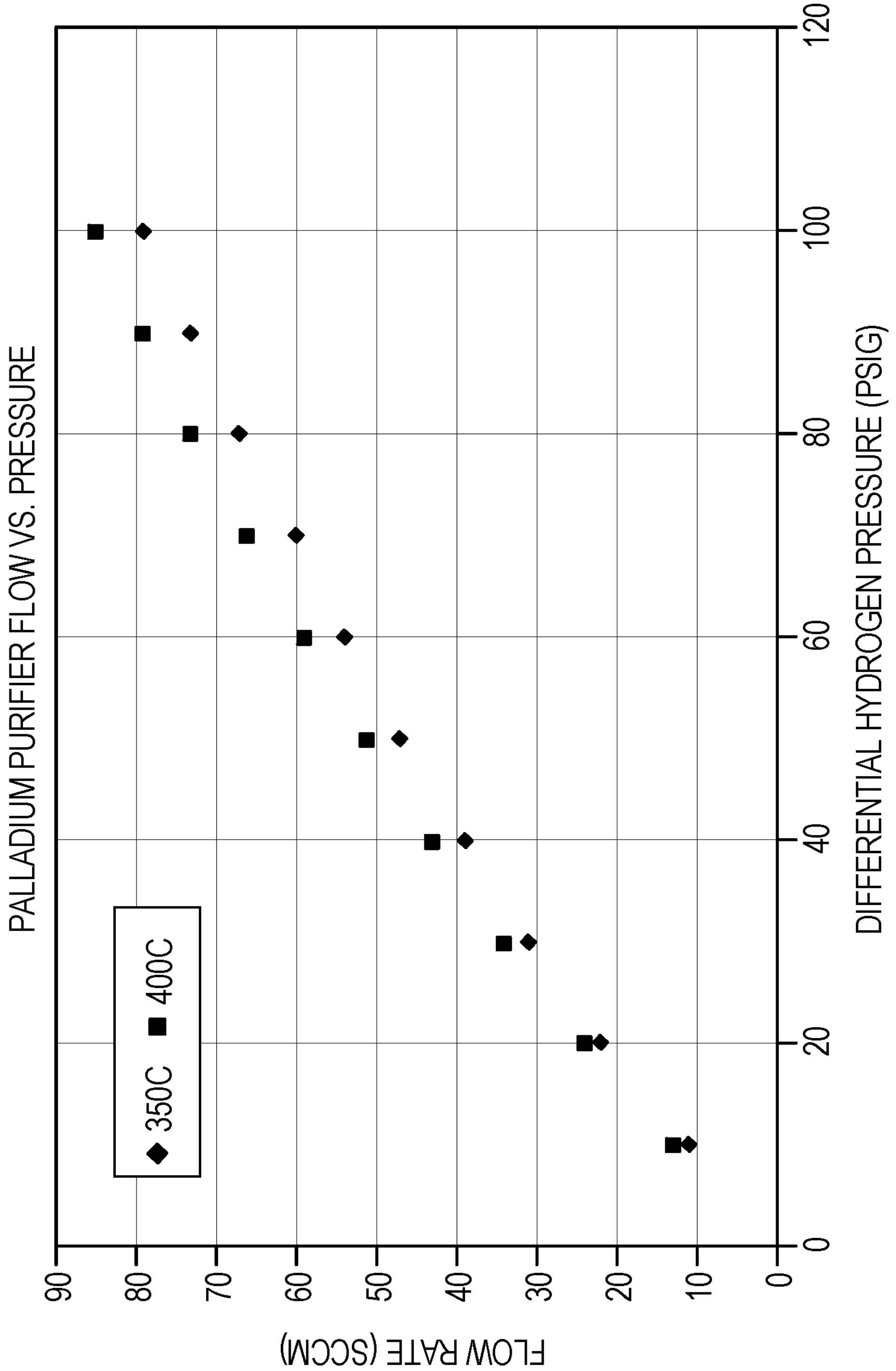
FIG. 3*a* is a graph illustrating hydrogen diffusion through a palladium alloy purifier vs. differential pressure.
Figure 3B:
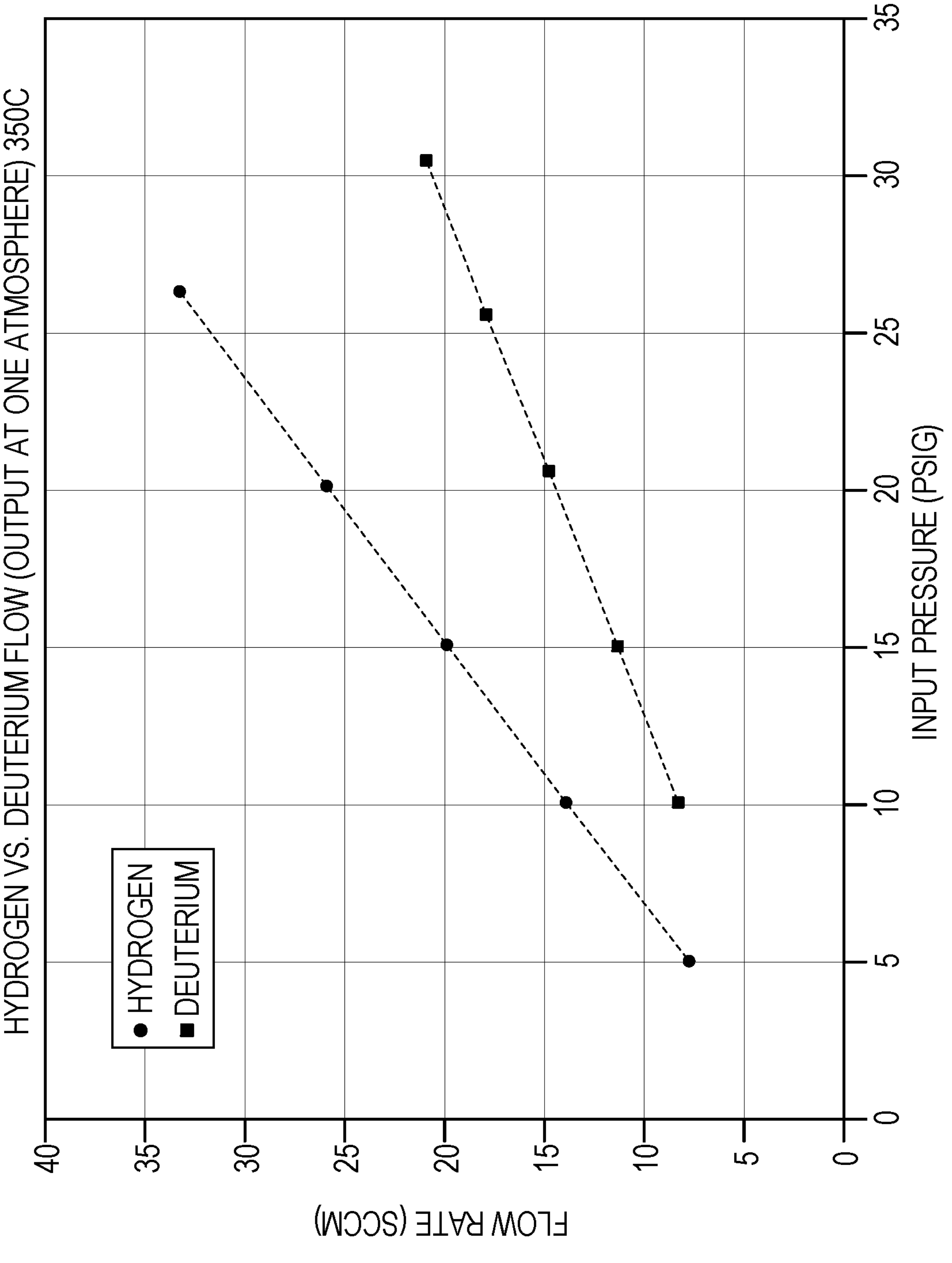
FIG. 3*b* is a graph illustrating hydrogen vs. deuterium diffusion rates through a palladium alloy purifier.

A tube as described above (2 mm outer diameter×60 mm length×0.06 mm wall thickness and composition of 75% Pd and 25% Ag) when heated to 350 degrees Celsius with a pressure drop of 15 psig of pure hydrogen will permeate hydrogen in excess of 10 sccm. The pressure-flow characteristics of such a tube is illustrated in FIG. 3*a*. Lower amounts of palladium may be utilized than described above but will require higher PEM cell pressure, reduced membrane wall thickness or increased temperature. Operation at lower temperature and pressure facilitates safety, helps to eliminate potential PEM cell liquid or gas leakage, and results in less component stress which translates into higher reliability. In all cases, the amount of palladium used is a lower amount than conventionally used in hydrogen generators with palladium purifiers because of the low flow demand of back diffusion barrier 17 which requires less than about 10 sccm of hydrogen flow or less than about 5 sccm of deuterium flow. It should be noted that hardware typically employed for the generation of hydrogen gas from water can also be used to generate deuterium gas from heavy water. However, there are differences. For example, FIG. 3*b* illustrates the lower permeability of deuterium relative to hydrogen through a palladium alloy membrane under the same conditions. Although the permeation rate for deuterium is lower, it has been found that the back diffusion barrier 17 of FIG. 1 requires less than about 5 sccm of deuterium flow when a typical GC column is used e.g. 30 m×0.25 mm and having a flow rate of 1-1.5 sccm. This means the lower permeation rate of deuterium compared to hydrogen is not important because lower flows of deuterium are required for the gas-decoupled injection port relative to hydrogen.

The palladium purifier 9 may be heated during operation to a temperature above about 310 degrees Celsius such as 350 degrees Celsius. The preferred range from about 325 degrees Celsius to about 400 degrees Celsius. It is preferable to keep deuterium from contacting the palladium alloy membrane 8 when the temperature of palladium purifier 9 is below about 310 degrees Celsius. This prevents undue stress fatigue of the membrane 8 which can occur due to temperature induced phase transitions within the alloy structure. Membrane terminal end structures 80 and 90 can comprise maraging steel, an alloy of steel or a stainless steel. Membrane terminal end structures 80 and 90 are further silver soldered, vacuum oven brazed, laser welded or otherwise secured in order to confine the impure deuterium to one side of palladium alloy membrane 8. Only ultra-high purity deuterium and deuterium isotopes can pass through palladium alloy membrane 8 and exit the assembly through conduit 14. Impurities including water vapor, oxygen and organic compounds are forced to exit from the interior of palladium alloy membrane 8 through conduit 50.

Referring again to FIG. 1, an excess of deuterium gas produced by PEM cell 1 will enter the palladium purifier 9. This excess deuterium will clear accumulated contamination from the upstream side of palladium alloy membrane 8 by forcing it through back pressure regulator 6 when the upstream pressure exceeds a target value such as 80 psig. As a non-limiting example, the flow through regulator 6 may be less than about 5 sccm, such as 2 sccm. Ultra-high purity deuterium gas permeating palladium alloy membrane 8 establishes a downstream pressure based on back-pressure solenoid valve 24 driven by feedback from pressure sensor 36. In a preferred example, the deuterium pressure downstream of membrane 8 is from about 40 psig to 70 psig such as 60 psig. This will allow sufficient flow of deuterium to back diffusion barrier 17 when flow restrictor **16*b* is sized to allow a flow of from about 4 sccm to about 10 sccm of deuterium. Back diffusion barrier 17 of a carrier gas-decoupled injection port 23 receives deuterium gas from valve 15 as well as a non-hydrogen pressurization gas 20 from a digital pressure and flow controller (DPFC) module 19 sometimes referred to as electronic pressure control (EPC). The DPFC module 19 utilizes conventional DPFC hardware but differs operationally in two respects. First, the hardware receives a gas type differing from deuterium to be used for septum purge flow 21 and split vent flow 22**. Secondly, the algorithm used to control the column head pressure is based on the viscosity of deuterium, while the algorithm used to control split and purge flows are based on the viscosity of the pressurization gas.

Valve 15 of gas-decoupled injection port 23 has two states of operation. In the energized state, the valve is open and delivers a low flow of deuterium determined by restrictor **16*b* to back diffusion barrier 17 such as a flow of from about 4 to about 10 sccm. The flow of deuterium in the back diffusion barrier 17 occludes the non-deuterium pressurization gas 20 from entering the GC column 18. In a second state, the valve 15 is de-energized and closed. In the closed state, a small residual deuterium purge of a few tenths sccm passes through parallel restrictor 16*a* in order to eliminate solvent back diffusion during injection. The pressurization gas preferably comprises argon or nitrogen. These gasses are inert, low cost, abundant and are often already equipped on GCMS triple quadrupole mass spectrometers which require nitrogen or argon collision cell gas. Any other gas with similar characteristics could be used such as carbon dioxide. The small residual purge of deuterium in the closed state of valve 15 is insufficient to prevent pressurization gas from entering the GC column 18**. The pressurization gas entering the GC column acts to transfer sample analytes during an injection phase of the chromatograph.

It should also be understood that although preferred, valve 15 and restrictors **16*a* and 16*b* are not strictly necessary for a gas-decoupled injection port to operate. Rather than using a valve to stop or otherwise reduce the flow of deuterium into back diffusion barrier 17, the DPFC module 19 can instead apply a pressure surge during the injection phase in order to transfer analytes to the column 18. This mode of sample transfer is described in U.S. Pat. No. 11,255,828. The ideal case is to deliver an amount of carrier gas to the back diffusion barrier 17 which is just above that which is necessary to prevent the auxiliary gas from entering the column 18 during analysis. This allows using a minimum of pressure surge to transfer analytes. However, since there is variability in the tolerances of column 18 on a column to column basis, it can be a time consuming endeavor to optimize. Thus, it is preferred to use valve 15 and restrictors 16*a* and 16*b* and use an amount of deuterium gas delivered to back diffusion barrier 17** which is large enough to offset this variability. This results in better ease-of-use.

As noted earlier, the palladium alloy membrane 8 should not be exposed to deuterium when less than about 310 degrees Celsius. An electrically actuated solenoid valve 27 can receive a non-deuterium inert purge gas such as argon or nitrogen from a gas entry point 30. The pressure of the non-deuterium purge gas may be higher or lower than the setpoint pressure of deuterium generated by PEM cell 1. Setting the pressure higher than the setpoint will allow faster purging of deuterium when the system is placed in a standby (non-deuterium producing) condition, or during a power failure such that deuterium can be vented through restrictor 29. The purge gas can maintain a positive pressure on the upstream side of palladium membrane 8 relative to the output side in order to prevent reverse pressurization. This can help guard against potential collapse of the membrane.

The absence of deuterium on the inside of membrane 8 will allow back diffusion of deuterium from the opposite side of the membrane so long as the purifier 9 remains hot. This will clear the purifier of deuterium from both sides of the membrane. It is to be understood that normally open (N.O.) valves 27 and 28 refer to the un-energized state of the valves. During operation, these valves are energized (closed) such that during a power failure they will open allowing the purge gas source to vent deuterium from purifier 9. The flow rate of purge gas entering entry point 30 can be governed by flow restrictor 29. In addition, a pneumatic check valve (not illustrated) can be placed across the input and output of palladium alloy membrane 8 in order to ensure the output pressure will remain in safe limits. Tubular metallic alloy membranes with thin wall structures are able to handle higher internal pressures than external pressures due to the tensile strength of the metallic alloy. Normally open valves 27 and 28 can remain open during a heat up phase of palladium purifier 9, and close when the purifier rises above a target temperature such as above 340 degrees Celsius. The closing of valves 27 and 28 can occur in concert with the delivery of power to the PEM cell 1. The opening of valves 27 and 28 can occur during a shutdown sequence of the deuterium generator, during a low power standby condition or during a power failure.

The opening and closing of valves 27 and 28 may be governed by a timer or in response to an instruction executed by a microprocessor monitoring pressure and/or temperature conditions of PEM cell 1. PEM cell 1 may be configured to produce more deuterium that what is required for operation of the carrier gas decoupled inlet 23. This excess gas may be used to purge residual heavy water or other gas phase impurities from the upstream side of palladium membrane 8 or it may be allowed to diffuse through the membrane where it establishes a deuterium flow in excess of what is required through back diffusion barrier 17.

It is to be understood that although the embodiment of FIG. 1. Illustrates a non-conventional back-pressure regulation scheme with a constant rate of deuterium production, that a conventional variable rate method may also be used.

Figure 4:
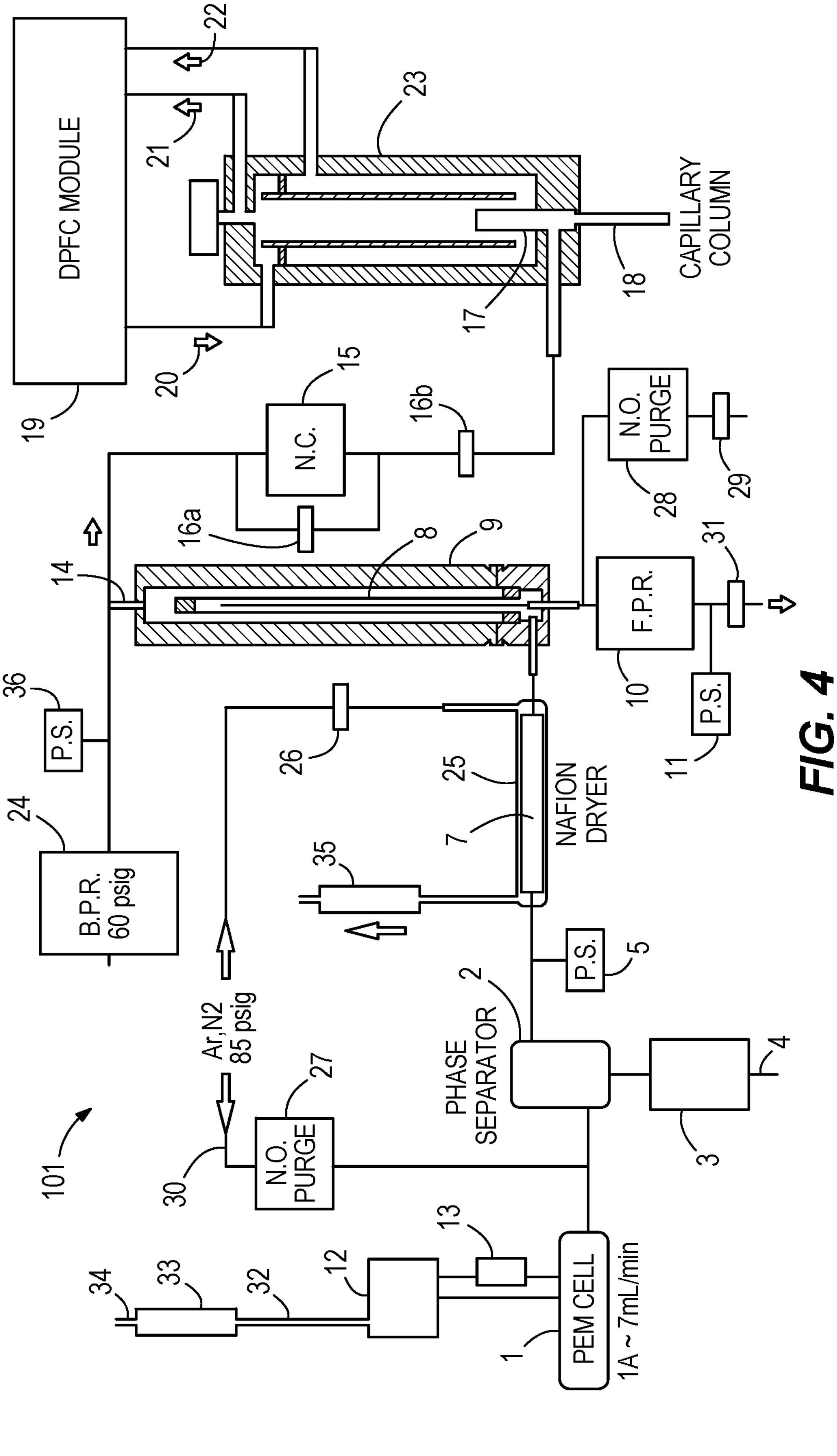
FIG. 4 is a schematic diagram of a gas generation system in accordance with the present disclosure using fore-pressure regulated output and heavy water reclamation means.

FIG. 4. illustrates a fore-pressure system embodiment 101 optimized for deuterium cost savings. PEM cell 1 operates with a variable drive current using feedback from pressure sensor 36 to maintain a target output pressure in conduit 14. The current to PEM cell 1 though variable, can also be set to deliver a maximum flow of less than 10 sccm such as 7 sccm. Pressure sensor 5 may also act to reduce or stop the drive current of PEM cell 1 if an over pressure condition exists on the upstream side of palladium alloy membrane 8. This can occur in the event of a poisoned membrane or when the membrane is first exposed to deuterium and the membrane is not yet fully equilibrated. A back pressure regulator 24 can be configured to open only if pressure sensor 5 senses an upstream pressure less than a downstream pressure as measured by sensor 36. A fore-pressure regulator 10 acts to set a pressure upstream of restrictor 31 using feedback from pressure sensor 11 to set a purge flow of less than 5 sccm such as 2 sccm.

A chilled reflux tube 32 may act to condense deuterium vapor in the oxygen effluent stream and return it to reservoir 12. Alternatively, (or in addition to) a gas dryer such as an anhydrous indicating gas dryer 33 may be fitted to prevent heavy water loss to the atmosphere. Dryer 33 can subsequently be post-processed when it has been saturated in order to recover the heavy water lost through evaporation. A check valve can also be attached to exit line 34 to reduce ingress of atmospheric water. An additional dryer 35 and similar components may be fitted to the exit of the purge tube 25 to recover heavy water from the Nafion dryer 7 used to dry the deuterium.

Figure 5:
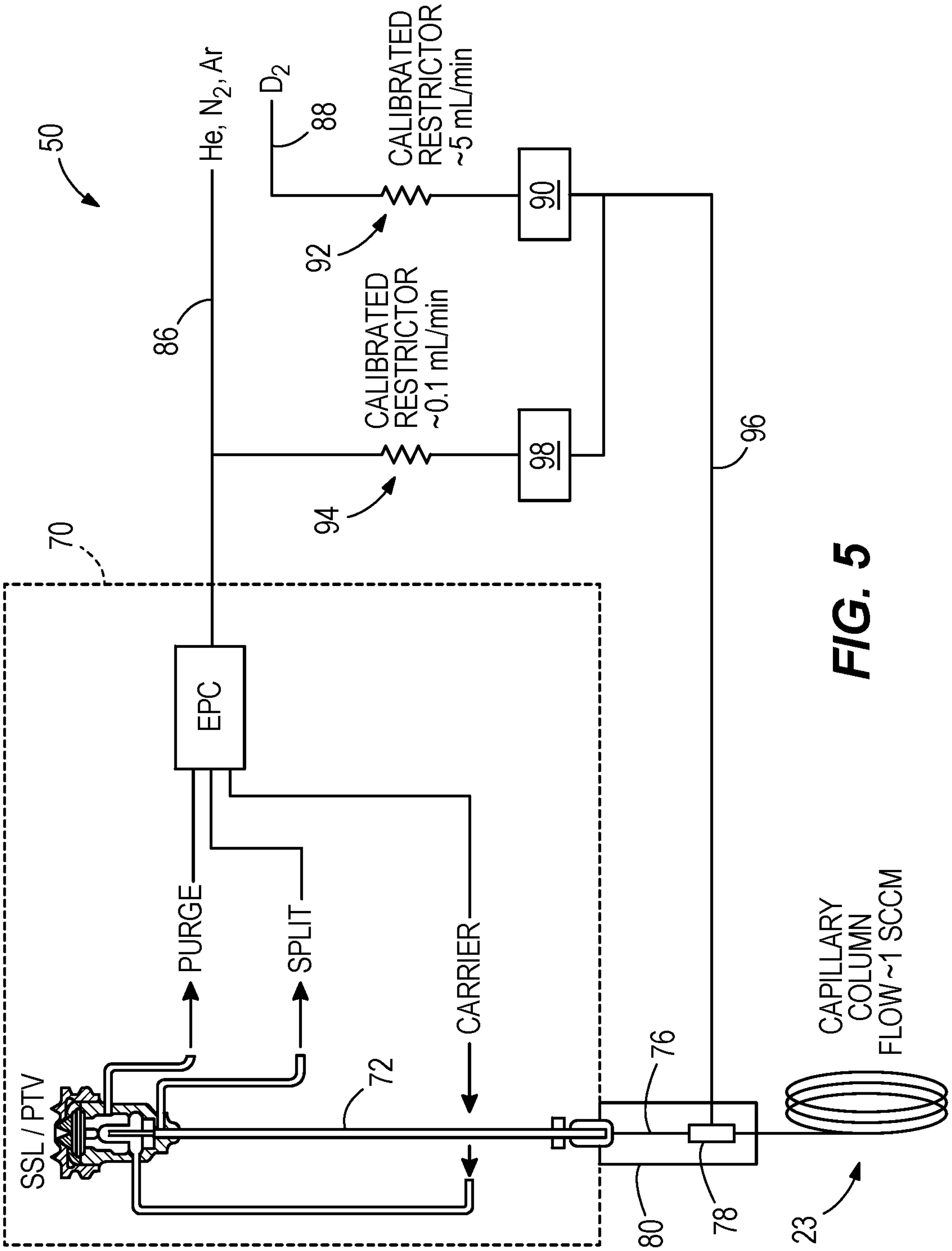
FIG. 5 is a schematic diagram illustrating a carrier gas-decoupled injection port that may be used in the gas chromatograph.

FIG. 5. illustrates how the carrier gas-decoupled injection port defined herein may be used in a gas chromatograph system 50. In the system 50, deuterium is delivered into tubing 88 that incorporates a fixed gas-flow restrictor 92. A valve 90 allows blockage of deuterium transport through restrictor 92. Similarly, an inert gas, such as helium, nitrogen or argon, is delivered into a separate tubing 86 from which it serves to pressurize the EPC unit. The inert gas can also serve as a residual gas purge by diverting a portion of the inert gas flow through restrictor 94 (which can be enabled by opening of valve 98). It is preferred to use an inert gas as the residual purge since even low flows of deuterium, e.g. ˜0.1 standard cubic centimetres per minute (sccm), can result in potentially undesired reactions such as deuterium addition to unsaturated double bonds when the inlet is very hot and the inlet liner has active sites.

The purpose of the small residual purge is to prevent back diffusion of solvents and sample into the deuterium delivery line during sample transfer, and to prevent peak tailing caused by void volume effects. In this non-limiting illustrative example, deuterium can be delivered at an upper flow of approximately 5 sccm when valve 90 is in the open state, and valve 98 is in the closed state, and a residual purge of approximately 0.1 sccm of inert gas when valve 90 is in the closed state and valve 98 is in the open state. The input pressures of inert gas and deuterium gas as well as the dimensions of restrictors 92 and 94 can be selected in accordance with the Poiseuille equation such that sufficient deuterium flow (for prevention of back diffusion of inert gas during analysis) and inert residual gas purge (for prevention of peak tailing) are adequate for the inlet pressure in use. A computer algorithm or look up table can be used to set these pressures according to the analytical column dimensions, flow rates and temperatures of the GC method in use.

A capillary analytical column 23 passes through a tee-piece coupling junction 78, and terminates (i.e., at the column inlet end) within a heated back-diffusion prevention tube 76 whose inner diameter is slightly greater than the outer diameter of the analytical column. The entrance to the column 23 as well as the back diffusion prevention tube 76 and tee piece 78 can be heated within a thermal zone 80 which may be under thermal control that is independent of thermal control of the injection port 72 of injector. It is to be understood that the tee piece 78, and back diffusion prevention tube 76 can alternatively be integrated into the lower portion of injection port 72 utilizing the temperature control of the injection port 72 itself rather than thermal zone 80. In this latter case, it is preferable that the entrance to the analytical column 23 terminates within one centimetre of the entrance to the back diffusion prevention tube 76, thereby providing minimum pressure drop and compactness.

In operation of the system 50, either deuterium or an inert gas passes through the tubing 96 and into the tee piece coupler 78 within which it flows "upward" (more specifically, towards the top of the diagram as shown in FIG. 5) into an annular gap within the tube 76 that surrounds an inlet portion of the analytical column 23. The deuterium delivered to the tee piece 78 is provided at a flow rate that is somewhat higher than the column flow. For example, 5 mL/min of deuterium can be delivered for column flows of 1 mL/min. The excess deuterium will simply be diverted "upwards" (more specifically, towards the top of the diagram as shown in FIG. 5) where it contributes to the bulk purge gas used for septum purge and split flow control. Such back flow of deuterium also prevents back diffusion of the inert pressurization gas from entering the GC column. Decoupling of the purge gas from the gas used for chromatographic analysis has been described in U.S. Pat. No. 8,371,152 which is incorporated by reference herein in its entirety.

The embodiment shown in FIG. 5 allows setting an upper limit to the absolute deuterium flow to a low level such as 5 sccm. With this arrangement, there will be no unbounded deuterium flow into the GC oven in the event of a column fracture near the inlet, thereby providing an additional safety factor using deuterium as a carrier gas. Also, since the absolute flow of deuterium is low, a single deuterium generator can serve many gas chromatographs at the same time. When used in conjunction with a nitrogen gas generator, additional safety is provided since no high-pressure gas cylinders are needed. Routine changing of high-pressure gas cylinders is time consuming, involves safety risks and can contribute to instrument down time during maintenance. Thus, embodiments of the described disclosure provide a solution for deuterium use in chromatographs that offer reduced chemical reactions involving unsaturated bonds, increased safety and reduced maintenance.

Figure 6:
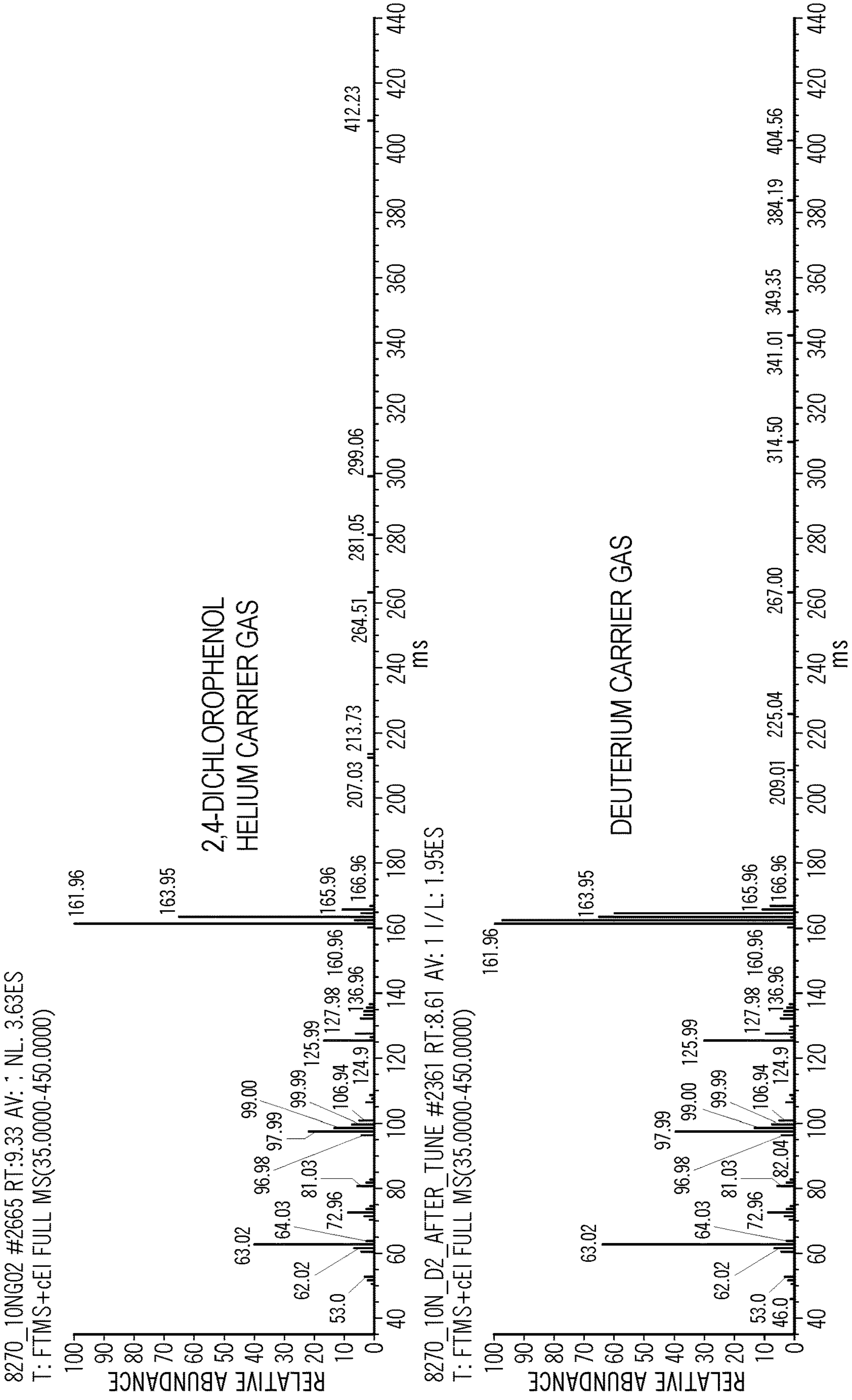
FIG. 6 is a spectral comparison of helium vs. deuterium for 2,4-Dichlorophenol.
Figure 7:
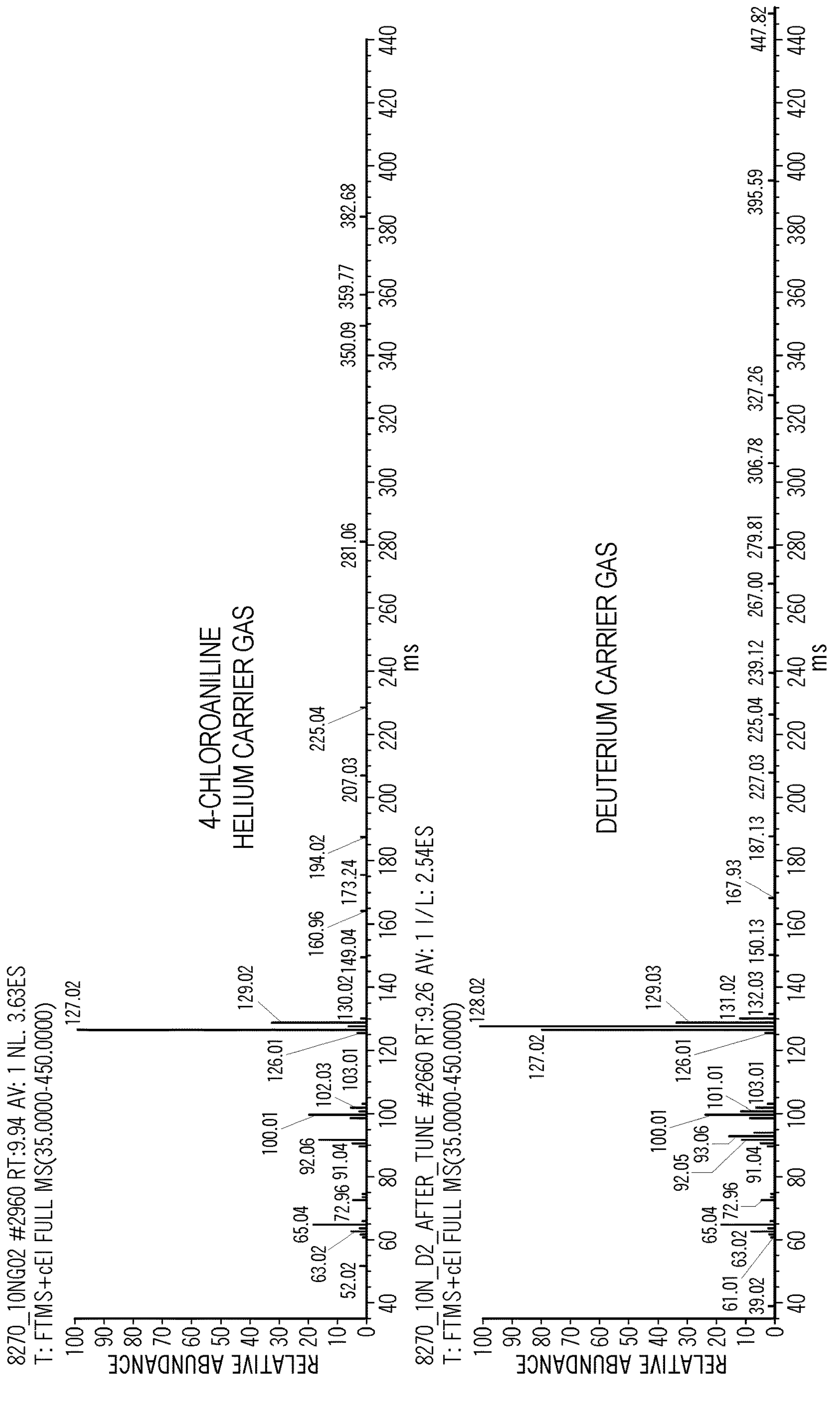
FIG. 7 is a spectral comparison of helium vs. deuterium for 4-Chloroaniline.

Although the above teachings describe how deuterium can be used on a high resolution GCMS system in order to replace helium, deuterium can undergo hydrogen-deuterium exchange (H/D exchange) reactions which may (or may not) be beneficial to an end user. While many compounds have nearly identical mass spectra, those with easily exchangeable protons can have mass spectra which vary markedly from reference libraries. FIG. 6 illustrates a mass spectrum of 2,4-Dichlorophenol when acquired using helium carrier gas (top) vs. using deuterium (bottom). FIG. 7 illustrates a mass spectrum of 4-Chloroaniline using helium (top) vs.

deuterium (bottom). Although these spectra illustrate differences at the nominal (unit-mass) level, spectral complexity increases further at high resolution.

It is anticipated that high purity deuterium generated by embodiments of the present disclosure could also serve as a source gas to supplement an ion trap, a collision cell or otherwise. As noted previously, ion traps and collision cells are well known in the art, and the use of deuterium can apply to any ion trap or collision cell. However, for simplicity, the disclosure will be referred to hereinafter with reference to quadrupole ion traps, such as those defined in U.S. Pat. No. 7,180,057 and collision cells as defined in U.S. Ser. No. 18/047,801 and are herein incorporated by reference.

The descriptions of specific exemplary embodiments of the present disclosure have been presented for purposes of illustration and description. They are not intended to be exhaustive or to limit the disclosure to the precise forms disclosed, and obviously many modifications and variations are possible in light of the above teachings. The exemplary embodiments were chosen and described in order to explain certain principles of the disclosure and their practical application, to thereby enable others skilled in the art to make and utilize various exemplary embodiments of the present disclosure, as well as various alternatives and modifications thereof. It is intended that the scope of the disclosure be defined by the Claims appended hereto and their equivalents.

For the avoidance of doubt, in this specification when we use the term “comprising” or “comprises” we mean that the detection cell or system being described must contain the listed components but may optionally contain additional components. Comprising should be considered to include the terms “consisting of” or “consists of” where the flow-through cell or system being described must contain the listed component(s) only.

For the avoidance of doubt, preferences, options, particular features and the like indicated for a given aspect, feature or parameter of the disclosure should, unless the context indicates otherwise, be regarded as having been disclosed in combination with any and all other preferences, options particular features and the like as indicated for the same or other aspects, features and parameters of the disclosure.

The term “about” as used herein, e.g. when referring to a measurable value (such as an amount or parameter), refers to variations of ±20%, ±10%, ±5%, ±1%, ±0.5%, or, particularly, ±0.1% of the specified amount.

The following is a description of a plurality of aspects of the present disclosure. 1) A deuterium gas generator system, wherein the deuterium generator system comprises an electrolysis cell and a palladium alloy purifier membrane having a surface area of not more than 10 square centimeters. 2) The system according to aspect 1, wherein the system is for a gas chromatograph having a carrier gas-decoupled injection port. 3) The system of aspect 1, wherein the palladium alloy purifier membrane has a surface area of not more than 5 square centimeters. 4) The system according to aspect 1, wherein the palladium alloy purifier membrane is a single linear tube of palladium alloy. 5) The system according to aspect 1, wherein the palladium alloy purifier membrane is a palladium silver purifier membrane. 6) The system according to aspect 1, wherein the palladium alloy purifier membrane is integrated in the electrolysis cell. 7) The system of aspect 6, wherein the operating temperature of the palladium purifier membrane is from about 60 degree to about 100 degree Celsius. 8) The system according to aspect 1, wherein the palladium alloy purifier membrane is separate from the electrolysis cell. 9) The system of aspect 8, wherein the operating temperature of the palladium purifier membrane is from about 310 degree to about 400 degrees Celsius. 10) The system of according to aspect 1, wherein the electrolysis cell has an active deuterium producing surface area of no more than 5 square centimeters and/or a deuterium generation current of no more than 7 amperes. 11) The system according to aspect 1, wherein the production rate of deuterium gas is no more than 100 standard cubic centimeters per minute. 12) The system according to aspect 11, wherein the production rate of deuterium is no more than 25 standard cubic centimeters per minute. 13) The system according to aspect 1, wherein the electrolysis cell comprises a heavy water circulation loop comprising a piezoelectric pump. 14) The system according to aspect 1, further comprising a forepressure regulator. 15) The system according to aspect 14, wherein the forepressure regulator provides an upstream pressure of from about 60 psig to about 150 psig, preferably about 80 psig. 16) The system according to aspect 1, further comprising a polymer ionomer drier for removing heavy water vapor from the deuterium gas. 17) The system of aspect 16, wherein the polymer ionomer drier is kept under vacuum. 18) The system of aspect 16, wherein the polymer ionomer drier is purged with dry gas. 19) The system according to aspect 1, wherein the electrolysis cell is a polymer electrolyte membrane. 20) The system according to aspect 1, wherein the system is integrated into a module within the chromatograph chassis assembly. 21) The system according to aspect 1, wherein the system is used in combination with an ion trap or a collision cell. 22) The system according to aspect 1, wherein the system further comprises a chilled reflux tube on the oxygen waste vent. 23) The system according to aspect 1, wherein the system further comprises an indicating silica gel sorbent trap. 24) The use of deuterium gas as a carrier gas in a gas chromatography system. 25) The use according to aspect 24, wherein the gas chromatography system comprises a high-vacuum. 26) The use according to aspect 25, wherein the vacuum is an ultra-high vacuum. 27) The use according to aspect 24, wherein the deuterium gas is provided by a deuterium gas generator system as defined in aspect 1. 28) The use according to aspect 24, wherein the deuterium gas in the chromatography system is provided by a compressed cylinder of deuterium gas. 29) The use according to aspect 27 or 28, wherein the chromatography system comprises a gas-decoupled injection port. 30) The use according to any one of aspects 27, 28 or 29, wherein the chromatography system further comprises an ion trap or a collision cell. 31) A gas chromatography system comprising a deuterium generator system as defined in aspect 1. 32) A gas chromatography system according to aspect 31, wherein the gas chromatography system has a carrier gas-decoupled injection port. 33) A method of gas chromatography wherein the carrier gas is deuterium. 34) A carrier gas-decoupled injection port comprising a carrier gas-decoupled inlet and a compressed cylinder of deuterium. 35) The use of deuterium gas in a collision cell or an ion trap (such as a quadrupole ion trap). 36) The use according to aspect 35, wherein the collision cell or ion trap (such as a quadrupole ion trap) is used in combination with a chromatography system. 37) The use according to aspect 36, wherein the chromatography system is a gas chromatography system. 38) The use according to aspect 37, wherein the gas chromatography system utlises deuterium as the carrier gas. 39) The use according to aspect 36, wherein the chromatography system is a liquid chromatography system. 40) The use according to aspect 35 or 36, wherein the deuterium gas is provided via a deuterium gas generator system as defined in aspect 1 or via a compressed cylinder of deuterium gas. 41) The use according to aspect 37, wherein the chromatography system comprises a gas-decoupled injection port. 42) A deuterium gas generator system according to aspect 1, for use in combination with an ion trap (such as a quadrupole ion trap) or a collision cell.

Various features and advantages of the disclosure are set forth in the following claims.

What is claimed is:

1. A deuterium gas generator system, the deuterium gas generator system comprising:
- a polymer electrolyte membrane having an active deuterium production surface area from about 1 square centimeter to about 5 square centimeters; and
- a palladium alloy purifier membrane having a surface area of not more than 10 square centimeters.

2. The deuterium gas generator system of claim 1, wherein the system is for a gas chromatograph having a carrier gas-decoupled injection port.

3. The deuterium gas generator system of claim 1, wherein the palladium alloy purifier membrane has a surface area of not more than 5 square centimeters.

4. The deuterium gas generator system of claim 1, wherein the palladium alloy purifier membrane is a single linear tube of palladium alloy or a palladium silver purifier membrane.

5. The deuterium gas generator system of claim 1, wherein the palladium alloy purifier membrane is integrated in the electrolysis cell.

6. The deuterium gas generator system of claim 1, wherein the palladium alloy purifier membrane is separate from the electrolysis cell.

7. The deuterium gas generator system of claim 1, wherein the electrolysis cell has an active deuterium producing surface area of no more than 5 square centimeters and/or a deuterium generation current of no more than 7 amperes.

8. The deuterium gas generator system of claim 1, wherein the production rate of deuterium gas is no more than 100 standard cubic centimeters per minute.

9. The deuterium gas generator system of claim 1, wherein the electrolysis cell comprises a heavy water circulation loop comprising a piezoelectric pump.

10. The deuterium gas generator system of claim 1, further comprising a forepressure regulator.

11. The deuterium gas generator system of claim 1, further comprising a polymer ionomer drier for removing heavy water vapor from the deuterium gas.

12. The deuterium gas generator system of claim 1, wherein the system is integrated into a module within a chromatograph chassis assembly.

13. The deuterium gas generator system of claim 1, wherein the system is used in combination with an ion trap or a collision cell.

14. A gas chromatography system comprising a deuterium generator system as defined in claim 1.

15. The gas chromatography system of claim 14, further comprising a carrier gas-decoupled injection port.

16. A method of gas chromatography, the method comprising:
- using a deuterium gas generator system including a polymer electrolyte membrane having an active deuterium production surface area from about 1 square centimeter to about 5 square centimeters and a palladium alloy purifier membrane having a surface area of not more than 10 square centimeters,
- providing deuterium gas using the deuterium gas generator system, and
- using the deuterium gas as a carrier gas in a gas chromatography system.

17. The method of claim 16, further comprising using a high-vacuum in the gas chromatography system.

18. The method of claim 16, further comprising including a gas-decoupled injection port in the chromatography system.

19. The method of claim 16, further comprising including an ion trap or a collision cell.

20. The method of claim 16, further comprising using deuterium gas in a collision cell or an ion trap.

21. The method of claim 16, further comprising using the collision cell or ion trap in combination with a chromatography system.

22. The method of claim 21, wherein the chromatography system is a gas chromatography system.

23. The method of claim 22, further comprising utilizing deuterium as a carrier gas.

24. The method of claim 21, wherein the chromatography system is a liquid chromatography system.

25. The method of claim 23, further comprising including a gas-decoupled injection port in the chromatography system.

26. A carrier gas-decoupled injection port, the carrier gas-decoupled injection port comprising:
- a carrier gas-decoupled inlet; and
- a cylinder of compressed deuterium;
- wherein the carrier gas-decoupled inlet is configured to receive deuterium from a deuterium gas generator system or the cylinder of compressed deuterium; and
- the deuterium gas generator system includes a polymer electrolyte membrane having an active deuterium production surface area from about 1 square centimeter to about 5 square centimeters and a palladium alloy purifier membrane having a surface area of not more than 10 square centimeters.

* * * * *